(12) United States Patent
Richardson

(10) Patent No.: US 7,854,042 B2
(45) Date of Patent: Dec. 21, 2010

(54) BUNDLING DEVICE

(76) Inventor: Ron Richardson, 1143 Reader Crescent NE, Calgary, Alberta (CA) T2E 5J8

( * ) Notice: Subject to any disclaimer, the term of this patent is extended or adjusted under 35 U.S.C. 154(b) by 746 days.

(21) Appl. No.: 11/749,425

(22) Filed: May 16, 2007

(65) Prior Publication Data

US 2008/0282513 A1    Nov. 20, 2008

(51) Int. Cl.
*B65D 63/10* (2006.01)
*A44B 18/00* (2006.01)

(52) U.S. Cl. .......................... 24/17 A; 24/16 R; 24/306; 24/442

(58) Field of Classification Search ................ 24/16 R, 24/16 PB, 17 R–17 AP, 306, 442; 40/316
See application file for complete search history.

(56) References Cited

U.S. PATENT DOCUMENTS

| | | | |
|---|---|---|---|
| 4,158,746 A | 6/1979 | Taylor et al. | |
| 4,700,432 A * | 10/1987 | Fennell | 24/16 R |
| 5,142,743 A | 9/1992 | Hahn | |
| 5,167,050 A | 12/1992 | Korson | |
| 5,168,603 A * | 12/1992 | Reed | 24/16 R |
| 5,603,591 A * | 2/1997 | McLellan | 410/97 |
| 6,311,637 B1 * | 11/2001 | Moss | 116/200 |
| 6,596,942 B2 * | 7/2003 | Ito et al. | 174/72 A |
| 7,124,975 B2 | 10/2006 | Richardson | |
| 7,134,200 B2 | 11/2006 | Boldy | |
| 7,587,796 B1 * | 9/2009 | Schultz | 24/306 |
| 2007/0053646 A1 | 3/2007 | Kendricks | |

* cited by examiner

*Primary Examiner*—Robert J Sandy
(74) *Attorney, Agent, or Firm*—Maxey Law Offices, PLLC; Stephen Lewellyn

(57) ABSTRACT

A reusable bundling device for wrapping and securing bundles of cable, rope, hose, electrical cords and other elongated members. The bundling device includes a flexible strap having one surface covered with hook members and an opposed second surface covered with a plurality of loop members. The hook members are releasably engagable with the loop members to encircle and retain the bundle. The first end of the flexible strap is removably attachable to a portion of the cord. Further, the bundling device is color coded to facilitate the identification of useful information pertaining to the cord and to rematch the strap once removed from the cord.

9 Claims, 3 Drawing Sheets

BUNDLING DEVICE

BACKGROUND OF THE INVENTION

1. Field of the Invention

The present invention relates to a bundling device for bundling and identifying elongated members such as cords, cables, hoses and the like.

2. Description of the Related Art

A wide array of devices such as straps or ties are known in the prior art for use in retaining elongated members such as various cords, wires, and cables while in use and when coiled for storage. The terms "wires", "cables", "cords", and "hoses" are considered equivalents for the purpose of the instant application, and are used interchangeably herein. The devices heretofore devised and utilized are known to consist of expected, obvious, and familiar structural configurations, notwithstanding the wide variety of designs encompassed by the crowed prior art which have been developed for the fulfillment of a myriad of objects and requirements.

Descriptions of such heretofore devices are found in U.S. Pat. No. 4,893,381 to Frankel; U.S. Pat. No. 4,963,410 to Bryant; U.S. Pat. No. 5,142,743 to Hahn; U.S. Pat. No. 5,167,050 to Korsen; and U.S. Pat. No. 5,168,603 to Reed.

While these devices fulfill their respective, particular objectives and requirements, they do have the disadvantage of being time consuming or cumbersome to use, in some cases are easily dislodged resulting in the cord becoming loose, do not provide visual indications of useful information pertaining to the cord and/or the bundling device, and are not capable of organizing a group of similar cords. Accordingly, there exists a need for an improved cord bundling device.

SUMMARY OF THE INVENTION

The present invention overcomes the limitations and disadvantages present in the art by providing a cord bundling and organizing device which is easily used, readily removably attachable to a cord, capable of organizing large groups of similar cords and bundling devices, and provides visual indications of useful information pertaining to the cord and/or the bundling device.

Accordingly, and generally in one aspect, the present invention provides a bundling device including a flexible strap member of a preselected length having opposed first and second surfaces and opposed first and second end portions. A detachable engagement means for detachably engaging the first end portion of the flexible strap member to a portion of an elongated member. The first surface of the flexible strap member includes a plurality of hook members, and the second surface of the flexible strap member includes a plurality of loop members that are releasably engagable with the plurality of hook members to circumferentially enclose a plurality of additional elongated members. The detachable engagement means includes a first color coding as a means to facilitate the identification of the elongated members circumferentially enclosed by the bundling device. The flexible strap member is color coded and the detachable engagement means further includes a second color coding to correspond to the flexible strap color code as a means to facilitate the matching of the flexible strap member with the detachable engagement means.

In general, in another aspect, the present invention provides a bundling device including a flexible strap member of a preselected length having opposed first and second surfaces and opposed first and second end portions. A detachable engagement means for detachably engaging the first end portion of the flexible strap member to a portion of an elongated member. The detachable engagement means having a first member being affixable along a portion of an elongated member, and a second member affixed to the first end portion of the flexible strap member and being releasably engagable with the first member.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
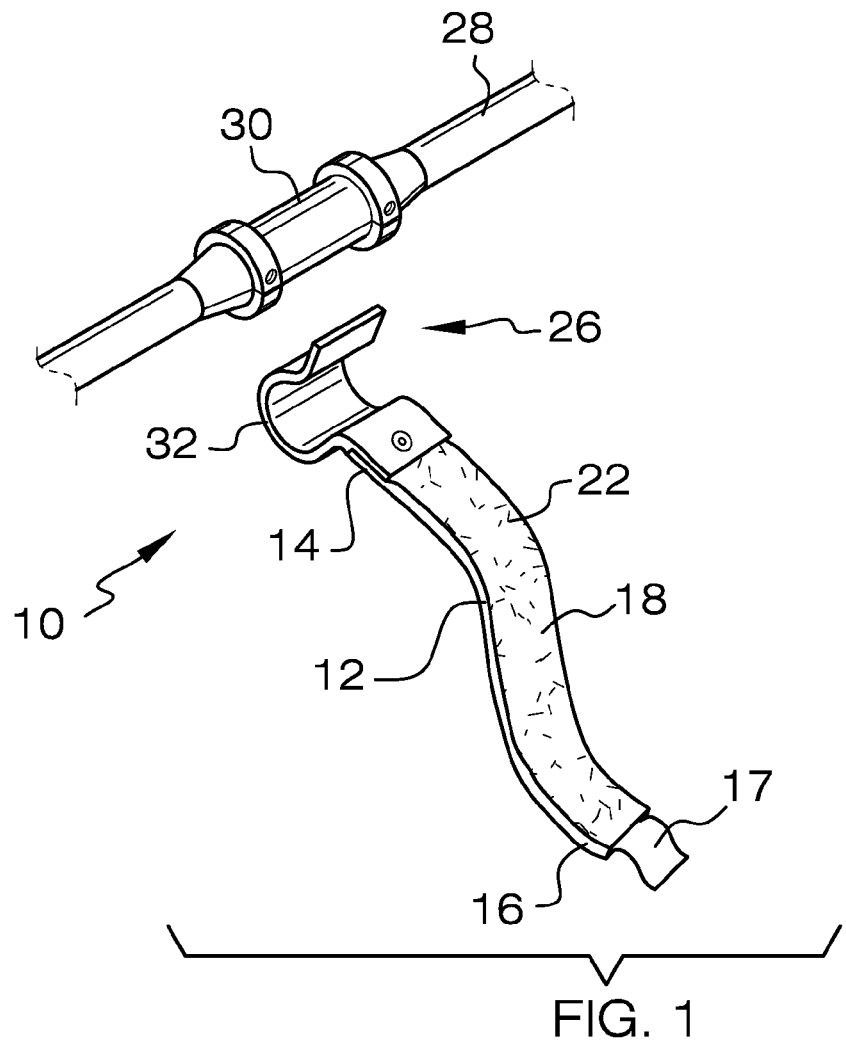
FIG. 1 is a diagrammatic perspective view of the bundling device constructed in accordance with the principles of the present invention.
Figure 2:
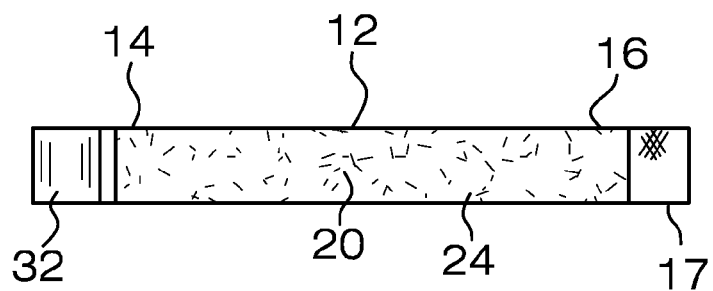
FIG. 2 is a top plan view of the bundling device.

Referring now to FIGS. 1-5 of the drawings, reference numeral 10 generally designates the bundling device of the present invention. Referring particularly to FIGS. 1 and 2, the bundling device 10 includes a flexible strap member 12 of a preselected length. The strap member 12 has opposed first and second ends 14, 16, and opposed first and second surfaces 18, 20. The first surface 18 is provided with a plurality of hook members 22, and the second surface 20 is provided with a plurality of loop members 24. The second end 16 can include a pull strap 17 extending therefrom. The bundling device 10 further includes a detachable engagement means shown generally at 26 for releasably attaching the first end 14 of the strap member 12 to a portion of an elongated member 28, such as a cord to be bundled.

The detachable engagement means 26 includes a first member 30 that is fixedly attached to a portion of the cord 28 and a second member 32 that is separate from the first member and which is fixedly attached to the first end 14 of the strap member 12. The first and second members 30 and 32 include cooperating structures which permit the members to be detachably engagable to each other. In an exemplary embodiment, the first member 30 includes a structure to which the second member 32 can be clipped to in a resilient manner. For example, the first member 30 can include a cylindrically body portion and the second member 32 can include a clip body adapted to at least partially encircle the body portion of the first member. It is important to note, the spirit of the detachable engagement means 26 is to provide a first element that is fixedly attachable to a portion of a cord and a second element that is fixedly attached to a portion of a strap, wherein the first and second elements are detachably engagable with each other, thereby permitting the flexible strap member 12 to be removably attached to the cord 28.

Figure 3:
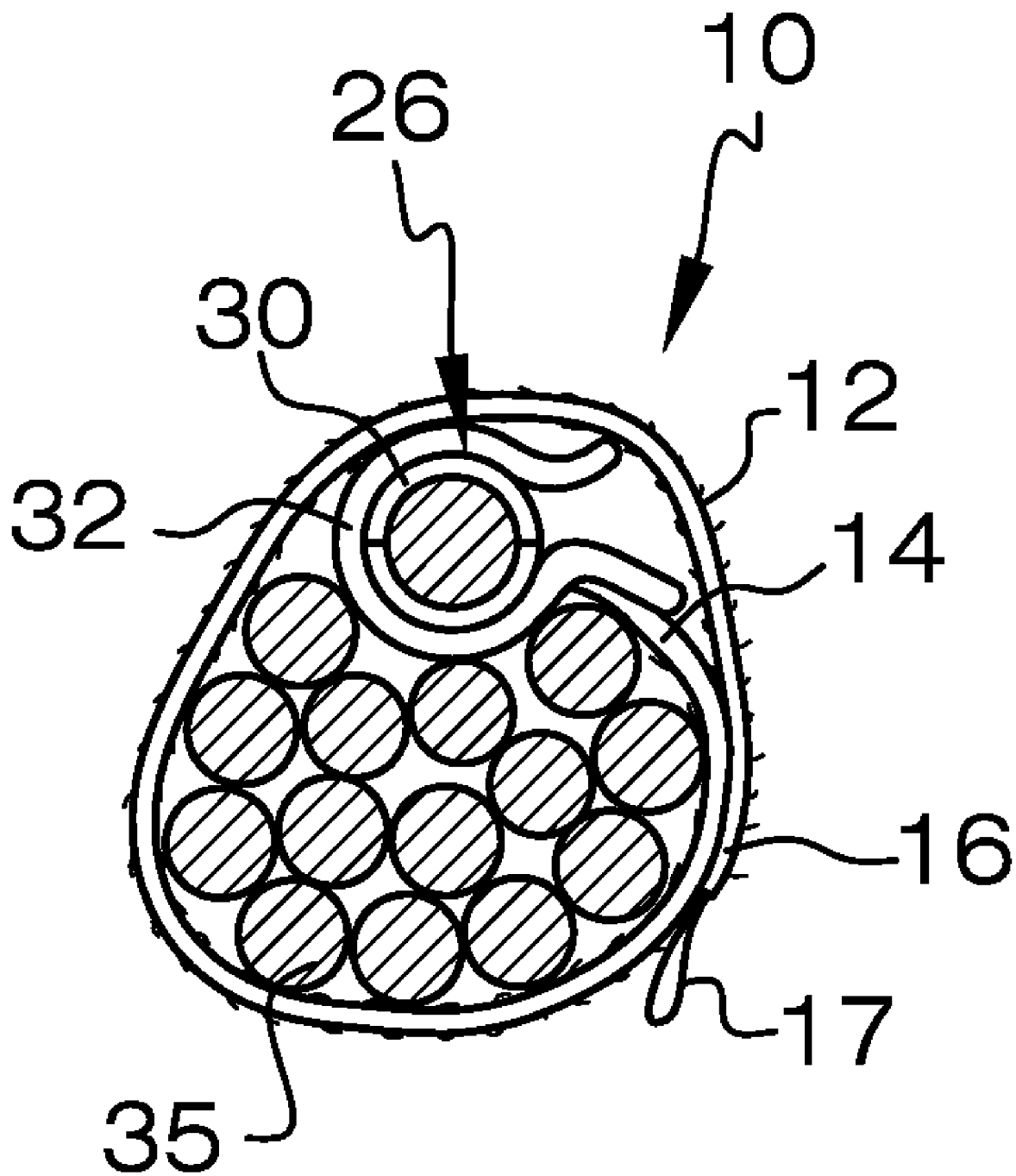
FIG. 3 is a side elevation view of the bundling device in use bundling a plurality of members.

Referring now to FIG. 3, the bundling device 10 is shown securing a bundle of members 35 (e.g. cable, cord, hose, etc.). The flexible strap member 12, secured at the first end 14 to a portion of the cord by the detachable engagement means 26, is wrapped around the bundle of members 35 and secured to itself by the plurality of hook members 22 that are releasably engagable with the plurality of loop members 34 to circumferentially enclose the members. The strap member 12 may be removed from the bundled members 35 by pulling tab 17 away from the bundled members, thereby disengaging the hook members 22 from the loop members 24. The strap member 12 may be completely removed by decoupling the first and second members 30 and 32 of the detachable engagement means 26. The preselected length of the strap member 12 is dependent upon the overall circumference of the desired bundle.

The bundling device 10 includes a color code as a means to identify useful information about a particular cord and as a means to correctly match a strap member 12 to a cord from which it was removed. The important aspect of this feature is found in situations where numerous cords of different properties, such as gauge, length, voltage rating or purpose are utilized concurrently at a job site or work site. It is desirable to, first, be able to remove the strap member 12 from a cord when the cord is in use to prevent wearing of the strap member and to prevent the strap member from interfering with the manipulation of the cord while in use. Additionally, it is desirable to be able to learn useful information pertaining to a particular cord quickly and easily simply by looking at visual indication associated with the cord.

Figure 4:
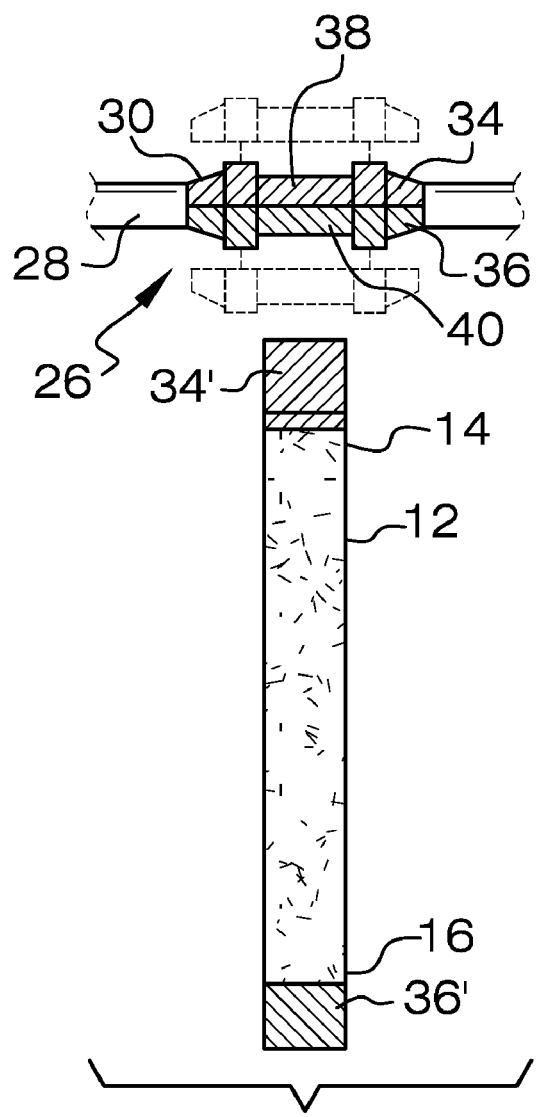
FIG. 4 is a plan view of the bundling device showing an example of a color code arrangement.
Figure 5:
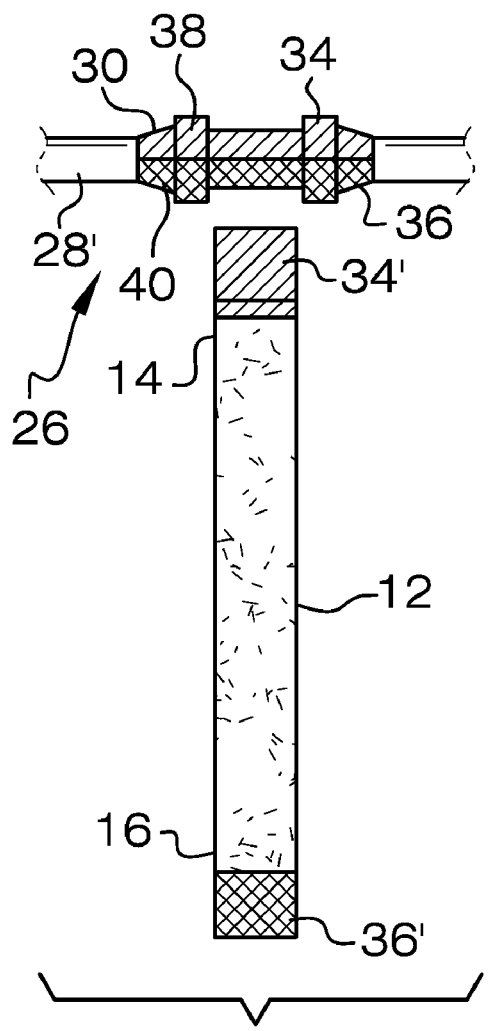
FIG. 5 is a plan view of the bundling device showing a second example of a color code arrangement.

Referring now to FIGS. 4 and 5, in providing the above described color coding, the first member 30 of the detachable engagement means 26 includes a first color code 34, and the second member 32 includes a corresponding color code 34'. Additionally, the first member 30 includes a second color code 36 of a color different from the first color code 34. The strap member 12 includes a color code 36' that corresponds to the second color code 36 of the first member 30. The first color code 34 permits matching of the second member 32 with the first member 30. The second color code 36 permits matching of the strap member 12 with first member 30, thereby facilitating the matching of the strap member with the correct cord.

With a comparison between FIGS. 4 and 5, a quick understanding of the color code system can be attained. For example, the cords 28 and 28' of FIGS. 4 and 5 respectively have one similar property, such as gauge, and one dissimilar property, such as length, i.e. the cords 28 and 28' have the same gauge but different lengths. With reference to the color coding of the bundling devices 10 shown in FIGS. 4 and 5 the similar and dissimilar properties are easily ascertained. The gauge of the cords 28 and 28' is indicated by the first color code 34 which is the same in both examples, and the length of the cords are indicated by the second color code 36 which is different in both examples. Therefore, either through memorization of the color codes or using a color chart, one can easily learn the various properties the each cord.

Additionally, the color coding further ensures the correct matching between a strap member 12 and an associated cord 28. As shown in FIG. 4, the color code 34' of second member 32 matches the first color code 34 on the first member 30, and additionally, the color code 36' of the strap member 12 matches the color code 36 on the first member. Likewise in FIG. 5, color codes 34 and 34' match and color codes 36 and 36' match, thereby indicating a correct pairing between the cord 28 and the strap member 12. To further increase visibility of color code 36', the pull tab 17 can include the color code.

The first member 30 of the detachable engagement means 26 can include two half body portions 38, 40 that are detachably secured to each other to facilitate the attachment of the first member to a portion of the cord 28. One half body member carries the first color code 34 and the second half body member carries the second color code 36. In this manner, a plurality of half body portions having various color codes can be provided and then selected for attachment to a particular cord in accordance with the proprieties of the cord that are selected to be indicated. Additionally, a plurality of strap members 12 can be provided with various common color code combinations for pairing the with a particular cord.

It is important to note, while the above described example is related to an electrical cord, the identified information can include myriad of specific information pertaining not only electrical cords, but hoses, ropes and the like as well. For example, for a hose, the color coding could indicate the pressure rating of the hose, the length of the hose, the hose end fittings or a particular use of the hose. Additionally, for a rope or the like, the color coding could indicate the tensile strength of the cord, the material of the cord, or the length of the cord etc.

A number of embodiments of the present invention have been described. Nevertheless, it will be understood that various modifications may be made without departing from the spirit and scope of the invention. Accordingly, other embodiments are within the scope of the following claims.

I claim:

1. A bundling device comprising:
  a flexible strap member of a preselected length having opposed first and second surfaces and opposed first and second end portions, said first surface of said flexible strap member includes a plurality of hook members, and said second surface of said flexible strap member includes a plurality of loop members that are releasably engagable with said plurality of hook members to circumferentially enclose a plurality of additional elongated members;
  first member that is affixable along the portion of the elongated member, first member having two half body portions that are detachably secured to each other to facilitate the affixing of said first member to the portion of the elongated member, said first member further having a first color code as a means to facilitate the identification of the elongated members circumferentially enclosed by said bundling device;

a second member that is attached to said first end portion of said flexible strap member and is detachably engagable with said first member; and wherein said flexible strap member is color coded and wherein said first member further includes a second color code to correspond to said flexible strap color code as a means to facilitate the matching of said flexible strap member with said first member.

2. The bundling device of claim 1, wherein said first member carries said first and second color coding.

3. The bundling device of claim 2, wherein said second member is color coded to correspond with said first color coding.

4. The bundling device of claim 1, wherein one half body portion includes said first color coding, and wherein the other half body portion includes said second color coding.

5. The bundling device of claim 1, wherein said flexible strap member is color coded at said second end portion.

6. The bundling device of claim 1, wherein said second end portion includes a pull tab integrally formed therewith.

7. The bundling device of claim 1, wherein said first color coding identifies the gauge of the elongated members circumferentially enclosed by said bundling device.

8. The bundling device of claim 1, wherein said flexible strap member is color coded as a means to indicate the preselected length thereof.

9. The bundling device of claim 1, wherein:

said first member includes a cylindrical body portion; and said second member includes a clip body adapted to at least partially encircle said cylindrical body portion of said first member.

\* \* \* \* \*